May 4, 1965  E. DASH  3,182,172
STUD WELDING MEANS AND METHOD
Filed May 21, 1962
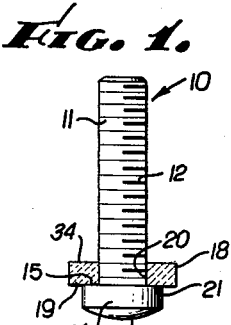
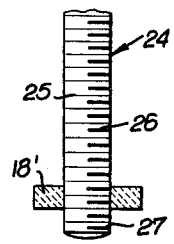
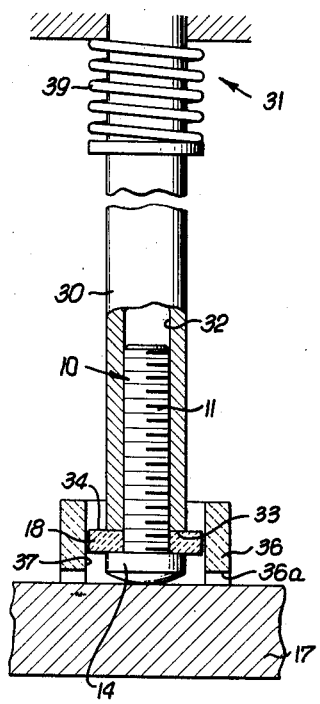
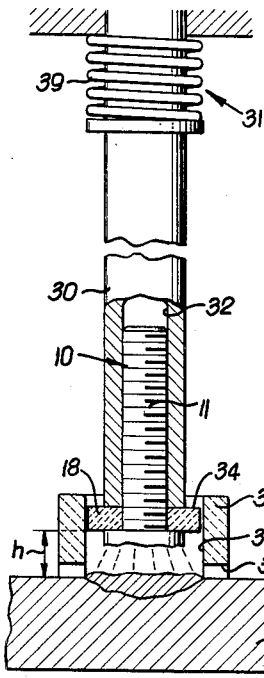
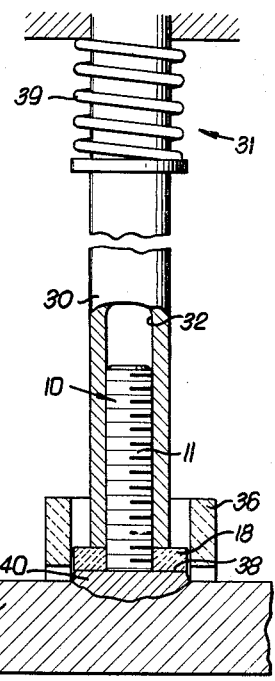
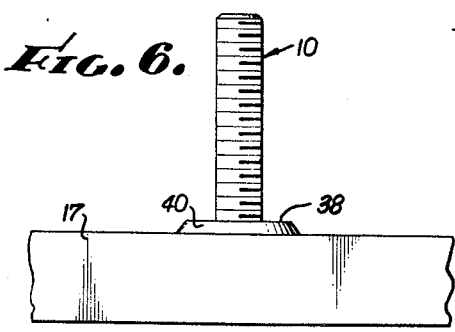
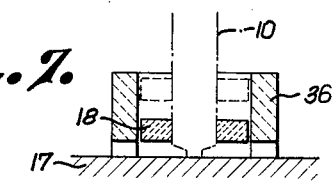
EDWARD DASH
INVENTOR.
BY Miketta and Glenny
ATTORNEYS.

United States Patent Office 3,182,172
Patented May 4, 1965

3,182,172
STUD WELDING MEANS AND METHOD
Edward Dash, 710 W. Columbia St., Long Beach 6, Calif.
Filed May 21, 1962, Ser. No. 196,403
19 Claims. (Cl. 219—98)

This invention relates to a stud welding means and method and, more particularly, to a welding stud and novel refractory means associated therewith in such a manner that the refractory means, including a refractory member movable in relation to a refractory ferrule serves to protect surfaces of the welding stud, surfaces of a chuck holding the stud, and provides a means and method whereby molten weld metal may be confined and worked as by forging during completion of a welding operation.

In some stud installations, it is desirable that studs welded to a work member, wall, or the like be provided with threads or attachment means on their surfaces which extend to and are closely proximate to the work member. In many such threaded stud installations, threads immediately adjacent the weld metal are either destroyed by splatter and collection of small particles of weld metal thereon or are distorted by the action of the welding arc during the welding operation. In such stud welding installations requiring threads intact up to the work member, prior proposed methods rarely achieved this result and cleaning or dressing of the threads on the stud was required.

A similar problem has been encountered when attempts were made to weld short studs to a work piece. A short stud, that is less than approximately ⅝" in overall length, was heretofore welded to a work member as part of a longer grooved or segmented stud, and was heretofore welded to a work member so that a stud gun chuck was not required to be positioned too close to the work member and the welding arc. After such a stud was welded, the outer portion of the stud was broken off in order to obtain a short stud of desired length. Such prior proposed use of break-off type studs and method was expensive, produced loss of stud material and, in general, was not economical or efficient.

When short studs on the order of ⅝" length or somewhat greater length were desired to be welded to a work piece and a break-off portion as described above was not employed, the end of a stud gun chuck was positioned so close to the work piece that particles of weld metal splatter would frequently fall or be deposited upon such chuck end and thereby rapidly render the chuck unusable until the weld metal splatter had been removed or dressed.

The present invention contemplates a novel stud welding means and method of stud welding which obviates the disadvantages of prior proposed methods and welding studs for this purpose. The present invention contemplates a stud welding means comprising a welding stud having a refractory ring-like member associated therewith at the welding end portion which will serve to protect threads or attachment means on a stud shank adjacent its welding end, to protect parts of a chuck means adjacent to the welding end, and in addition to provide, during a welding operation, a method of applying pressure as by forging to molten plastic metal which forms a fillet around the base of the stud.

The primary object of the present invention, therefore, is to disclose and provide a novel stud welding means and method including a refractory ring-like member serving as protective member for the stud and a chuck means and as a forging member for molten weld metal.

An object of the invention is to disclose and provide a novel stud welding method wherein molten, plastic metal which ultimately forms fillet metal is subjected to pressure in the plastic state and is shaped to a selected configuration.

A further object of the invention is to disclose and provide a welding stud and refractory ring-like member wherein a fillet of weld metal is worked in its plastic state to impart thereto beneficial characteristics to provide an exceptionally sound weld, a fillet which is symmetrical, and a fillet which has a surface shaped under pressure.

A still further object of the invention is to disclose and provide a welding stud having attachment means such as threads extending to a welding end portion and having means on the stud for protecting said threads during a welding process.

A still further object of the invention is to provide a stud welding means including a stud and refractory means associated therewith to provide a welding chamber which is variable in height during the welding operation in order to provide optimum welding conditions during a welding operation.

An important feature of the invention is to provide a novel refractory means for use with a welding stud, the refractory means including a refractory ferrule and a refractory member movable within the chamber of the ferrule to vary the height of the effective welding chamber.

Various other objects and advantages of this invention will be readily apparent from the following drawings in which exemplary embodiments of the invention are shown.

In the drawings:

FIG. 1 is an elevational view of a welding stud and ring member embodying this invention.

FIG. 2 is a modification of a welding stud and ring member embodying this invention.

FIG. 3 is a sectional view showing the welding stud and ring member in operative relation with respect to a ferrule, a schematically illustrated stud gun, and a work member.

FIG. 4 is a view similar to FIG. 3 and shows the welding stud in retracted poistion for drawing an arc between the head of the stud and a work member.

FIG. 5 is an elevational view similar to FIG. 3 showing the welding stud after it has been plunged into the pool of molten metal.

FIG. 6 is a side elevational view of a welding stud welded to a work piece in accordance with this invention.

FIG. 7 is a sectional view of a refractory means embodying this invention.

In FIG. 1 there is shown an exemplary welding stud means 10 embodying this invention. Welding stud means 10 comprises a shank portion 11 having threads 12 formed therealong for its entire length, or at least for the portion of the shank above its welding end portion indicated by an enlarged stud head 14. Head 14 provides an annular back face or shoulder 15 encircling the adjacent threaded portion of shank 11. Head 14 has a bottom or front face 16 adapted to be seated on a surface of a work member 17 to which it is to be welded.

A refractory means embodying this invention includes a refractory ring-like member or annulus 18 associated with stud shank portion 11. Refractory member 18 preferably may be made of any suitable frangible ceramic refractory material or other material having the characteristics of resisting fusing, reducing, heat, and the like. Refractory member 18 may have an outer diameter greater than the diameter of head 14 so as to provide peripheral marginal portions 19 which extend radially beyond the periphery of head 14.

The member 18 may be associated with, positioned, attached or secured to the shank portion 11 adjacent its welding end portion in suitable manner. As illustrated, threads on shank 11 may engage threads in through bore 20 of member 18. Member 18 is advanced along shank 11 until its bottom face 21 is seated on back face 15.

Another way of attaching member 18 to stud 10 is to provide shank 11 of a selected pitch diameter of threads to be thereafter rolled on shank 11. Ring member 18 may have a bore 20 only slightly larger than the pitch diameter of shank 11, may be slipped along shank 11 until it is positioned at said head 14, and then threads are rolled on shank 11 up to the member 18 and serve to hold member 18 in assembly with the stud. The height of ring member 18 determines the height of the unthreaded shank portion.

It will be understood that member 18 may be attached to stud 10 by other suitable friction means or by adhesive means. Attachment of the ring member 18 to the stud 10 is desirable in some instances so that the stud and member 18 may be handled as one unit for selling, shipping and during installation.

In some installations, ring member 18 may be simply sleeved or slipped over shank 11 of stud 10 for positioning upon head 14 as above described, just prior to a welding operation.

In FIG. 2, a different embodiment of the welding stud of this invention is illustrated. In FIG. 2, a welding stud 24 may be provided with a shank 25 having threads 26 thereon to its welding end 27. A ring member 18' may be carried by stud 24 and may be attached thereto adjacent to welding end 27 at a position which approximately provides therebelow an amount of metal of the stud which will be melted or burned off during a welding operation. Stud 24 does not include an enlarged head at the welding end portion. Any configuration of welding stud may be employed and be within the spirit of the present invention.

In FIG. 3, the welding stud 10 and ring member 18 of FIG. 1 are shown in assembled relationship with a chuck extension 30 of a stud welding gun 31 schematically indicated, such stud welding guns being well known. Chuck extension 30 may comprise a relatively long, cylindrical, hollow chuck member 30 and 31 having an internal bore 32 for receiving and grasping therein shank 11 of stud 10. The bottom end of shank extension 30 includes an end edge face 33 adapted to seat upon the top annular face 34 of ring member 18. Thus, member 18 is seated between back face 15 of head 14 and edge face 33 of extension 30 and is held in assembled relationship therewith.

During a welding operation, a ferrule 36 may surround the welding end portion of stud 10, refractory member 18, and the adjacent portion of chuck extension 30. The ferrule 36 may be of suitable shape of vented or nonvented type, and, in this example, is shown as a cylindrical wall of ceramic, refractory material adapted to be held in association with stud gun 31 in well known manner. Ferrule 36 may be provided with a ferrule opening or chamber 37 having an internal diameter greater than the external diameter of head 14, member 18, or chuck extension 30 so as to provide annular space therebetween. With respect to member 18, the annular space is only sufficient to provide free reciprocating movement of member 18 within chamber 37. Ferrule 36 may include bottom vent ports 36a arranged in spaced relation and of sufficient venting area to permit escape of welding gases and minimum expulsion of weld metal therethrough.

In a welding operation with the assembly of a stud gun 31, ferrule 36, ring-like member 18, and headed stud 10 as shown in FIG. 3, when welding current is applied to the stud gun after the chuck, stud, ring member, and ferrule are positioned with respect to a surface of a work member as shown, chuck extension 30 will retract the welding stud and ring member 18 a preselected distance from the surface of the work and a welding arc will be drawn between the bottom face 16 of stud head 14 and the work member. The bottom face 21 of the ring member 18 together with the opening defined by a ferrule 36 forms a welding chamber having a variable height indicated as $h$, this height being at maximum when the stud is fully retracted. As the welding current continues to flow, the metal of the work member immediately beneath head 14 is melted and the metal of the stud head 14 is likewise melted. When the welding current has been applied for a preselected time, in accordance with well known welding practice, the welding current is stopped and a biasing spring 39 of the stud gun drives the chuck extension, shank portion 11 and ring member 18 downwardly to plunge into the molten pool of weld metal the shank portion, and whatever portion of head 14, which might remain and which will be in a plastic, mushy state. The impact of stud 10 in the molten weld metal tends to laterally displace some of the molten metal radially outwardly and into the space to be occupied by metal forming the fillet. The ring member 18, backed by the chuck extension end face 33, rams against the top surface 38 of the molten weld metal and shapes this molten metal to conform to the bottom face of the ring-like member 18. The ramming action is in the nature of an impact forging action over substantially the entire surface of the molten metal because the metal is subjected to a sudden rapidly applied force. This forging action imparts beneficial characteristics to the weld metal such as an improved grain structure and reduced porosity. The height $h$ of the welding chamber is reduced to the height of the fillet to be formed. Thus, the total distance that the ring member 18 travels to deliver its impact forging action is equal to the sum of the following two lengths: first, the prior retraction of chuck 30 which occurred during drawing of the arc; and second, the difference in the height of the stud head 14 and the height of the final fillet 40. The required amount of molten meld metal is confined in the welding chamber provided by the ferrule opening 37 and the bottom face of the ring member 18. The ferrule 36 substantially, laterally confines the molten weld metal. The fit between the refractory ring member 18 and the ferrule serves to permit free longitudinal movement of the stud means and also to prevent splatter of weld metal radially outwardly and upwardly.

It should be noted that the variable height $h$ of the welding chamber defined by the opening 37 and the lower end of ring-like member 18 creates at least the following favorable conditions. First, the height $h$ is a maximum while the stud is fully retracted and weld metal from the weld end of the stud is being deposited on the work member. Additional weld chamber height because of full retraction assists in eliminating poor welds resulting from short circuiting and premature fusion of the stud to the work member. Second, weld chamber height $h$ is a minimum when the stud is plunged into the molten metal to produce a minimum fillet height and uniformly shaped fillets at the top surface.

It will be apparent that the refractory ring member 18 because of its position between the molten weld metal and the shank portion 11, which is received within chuck extension 30, effectively blocks and obstructs the passage of any small particles of weld metal which might be driven upwardly during the welding operation. It will be apparent that when the refractory member 18 is removed from stud shank portion 11, the shank portion will be free of any contamination by metal particles from the welding operation to and including the portion covered and protected by the member 18. The chuck extension 30 will similarly be free from stray metal particles because of the covering and protection afforded the chuck extension by the refractory ring member 18.

While the present invention has exemplarily shown a refractory ring member having a flat bottom face, it will be readily understood that such bottom face may be suitably configured in order to provide a desired shaping of the top surface of the fillet metal 40. For example, the inner bottom edge of the bore of the member 18 may be slightly beveled so as to provide a smooth mergence of the fillet weld metal with the metal of the shank portion 11 immediately adjacent thereto. Moreover, the outer circumferential margin of the bottom face of the refractory member may be suitably configured so as to provide a desired outer peripheral curvature to the fillet metal. The bottom face of the refractory member 18 may be concave in transverse cross-section or may be inclined at a selected angle to the axis of the stud so as to provide a desired direction to forging or pressure force components which will be imparted to the molten metal forming the fillet when the stud, refractory member, and chuck extension move downwardly during the plunge of the stud into the molten weld metal.

While a separate refractory ring member has been described above and means have been indicated for associating the refractory member with the welding stud for handling as a unit, it will be understood that a refractory member similar to member 18 may be attached to the end face of chuck extension 30 and serve the same function and purpose as that described above with respect to the refractory member 18. Such a refractory tipped chuck extension means may include means, such as adhesive bonding agents, for attaching such a refractory member to the chuck extension. It will be understood that any refractory member associated with a welding stud or a chuck means for the purposes of the present invention will be positioned with respect to the welding end portion of the stud so that the surface of the stud immediately adjacent the work member and the top of the fillet will be protected and will not require dressing or cleaning after a welding operation.

The combination of the ferrule 36 and the ring member 18 provides a novel refractory means for association with a welding stud as particularly illustrated in FIG. 7. While the refractory ferrule is normally stationary during a welding operation, the refractory ring member 18 associated therewith is vertically movable, and thus provides a welding chamber which is variable in height and volume. Such variable effective welding chamber provides a favorable envirmonment for the stud during a welding operation and creates conditions which beneficially affect the weld being made, the ring member serving as a forging member during the completion of the weld.

Various modifications and changes may be made in the above described stud welding means and method which may come within the spirit of this invention and all such changes and modifications coming within the scope of the appended claims are embraced thereby.

I claim:

1. In combination, a stud welding means comprising: a stud gun having a chuck extension means provided with a bottom face; a stud to be welded held in said extension means and having a stud welding end portion; and a protective member positioned at the welding end portion of the stud and having a top face for abutment with the bottom face of the extension means for imparting pressure forces during a welding operation to molten metal forming a fillet.

2. The combination as stated in claim 1 including means for attaching said protective member to said stud.

3. In combination: a stud gun having a movable chuck extension means; a welding stud held in said extension means; and a protective ring member of refractory material carried by said stud adjacent its welding end and having abutment with said chuck extension means for transmitting pressure forces through said ring member to molten metal forming a fillet during a welding operation.

4. A combination as stated in claim 3 wherein said welding stud includes an enlarged head, and said protective member is seated on said enlarged head.

5. In combination with a stud gun having a movable chuck extension member, the provision of: a welding stud having a weld end carried by said chuck extension member; a ferrule having an opening receiving said end; and a refractory ring-like member attached to said stud within said opening adjacent said welding end and adapted to abut said chuck extension member.

6. A stud welding means comprising: a welding stud having a shank and an enlarged head; and a refractory member seated on said head and encircling only the shank adjacent the head.

7. A stud welding means as stated in claim 6 wherein said refractory member projects radially beyond said head.

8. A means as stated in claim 6 wherein said refractory member is provided with a top pressure receiving surface.

9. A means as stated in claim 6 wherein said refractory member is frictionally attached to said shank.

10. A means as stated in claim 6 wherein said refractory member is threaded on said shank.

11. An article of manufacture comprising: a welding stud having a shank and an enlarged head at one end thereof; and a refractory member with a bore therethrough smaller than said head, said member being attached to the stud shank behind said head.

12. In combination, a stud welding means comprising: a stud gun having a chuck means; a stud to be welded held in said chuck means and having a stud welding end portion projecting beyond said chuck means; a refractory member positioned at the welding end portion of the stud and below said chuck means; and a ferrule member enclosing said stud welding end portion and refractory member; said chuck means being adapted to press against said refractory member during a welding operation for pressing said refractory member against molten weld metal.

13. In a stud welding means, the provision of: a refractory means comprising a ferrule having an opening therethrough and having a longitudinal axis, and a refractory member smaller than said opening and longitudinally movable therein, the lower surface of said movable refractory member and said ferrule opening providing a welding chamber of variable height.

14. A refractory means for use with a welding stud in an arc welding process comprising: a refractory ferrule having an axial through opening, and a refractory member smaller than said opening and longitudinally movable therein, the lower surface of said member being adapted to impart pressure to molten metal within said through opening and forming a fillet around said stud.

15. In combination with a welding stud having threads adjacent a welding end portion thereon and a ferrule encircling said portion and threads adjacent thereto, said stud being adapted to project beyond a stud holding chuck end: a refractory member attached to said stud at threads adjacent to said welding end portion above the part of the end portion to be melted and movable with said stud within said ferrule, said refractory member being encircled by said ferrule and being adapted to shield said chuck end against molten metal during welding and to shape the fillet weld metal.

16. In a stud welding method in which a stud is held by a chuck and has a stud welding portion with an adjacent refractory member received within a surrounding ferrule member and which includes the steps of retracting a stud from a work piece, drawing an arc between the stud and work piece, and plunging the stud into a pool of molten metal including molten metal forming a fillet weld, the step of: impact forging the molten metal forming the fillet weld during plunging of the stud into the molten metal pool by transmitting chuck plunging forces through the refractory member to the molten metal forming the fillet weld while closely confining such molten fillet metal by said ferrule member.

17. In a stud welding method in which a stud is held by a chuck and has a stud welding portion with an adjacent refractory member below said chuck and received within a surrounding ferrule member and which includes the steps of retracting a stud from a work piece, drawing an arc between the stud and work piece, and plunging the stud into a pool of molten metal including molten metal to form a fillet weld, the step of: applying an impact forging blow to the molten metal forming the fillet weld in the direction of and during the plunging of the stud into the molten pool of metal, said forging blow being applied through said refractory member and said ferrule member closely confining the molten fillet forming metal against lateral movement during said forging blow.

18. A stud welding means for use with a ferrule comprising: a welding stud having a welding end portion adapted to be melted during a welding operation within a ferrule and to project beyond a stud holding chuck end; and a refractory member extending outwardly from said welding stud and having a face directed toward said welding end portion, said refractory member being attached to said stud proximate to and above the portion to be melted, said refractory member being encircled by said ferrule and being adapted to shield said chuck end against molten metal during welding and to forge the fillet weld metal.

19. In the art of arc welding, a stud having a welding end portion received within a ferrule and held by a movable chuck of a stud gun with the end of the chuck extending into the ferrule; the provision of: a movable protective means encircling a portion of said stud and carried between said chuck and said stud welding end portion, said protective means being encircled by said ferrule and being adapted to shield said chuck end against molten metal during welding and to forge said molten fillet weld.

References Cited by the Examiner
UNITED STATES PATENTS

| Re. 22,108 | 6/42 | Crecca | 219—99 X |
| 1,982,098 | 11/34 | Hartmann | 219—98 X |
| 2,231,480 | 2/41 | Pilger | 219—99 X |
| 2,491,479 | 12/49 | Dash | 219—98 |
| 3,047,711 | 7/62 | Graham | 219—99 |

FOREIGN PATENTS 668,402  3/52  Great Britain.

RICHARD M. WOOD, *Primary Examiner.*